United States Patent [19]

Ferris

[11] 3,892,426

[45] July 1, 1975

[54] FIFTH WHEEL PLATE ASSEMBLY FOR TRAILER HITCH

[75] Inventor: Ray L. Ferris, Thornton, Ill.

[73] Assignee: Pullman Incorporated, Chicago, Ill.

[22] Filed: June 21, 1974

[21] Appl. No.: 481,714

[52] U.S. Cl. .................................. 280/432; 403/315

[51] Int. Cl.² .......................................... B62D 53/10

[58] Field of Search .................... 280/432, 434, 437; 403/315, 327, 330

[56] References Cited

UNITED STATES PATENTS

| | | | |
|---|---|---|---|
| 2,294,710 | 9/1942 | Berg et al. | 280/432 |
| 2,317,508 | 4/1943 | Zoder | 280/434 X |
| 2,736,573 | 2/1956 | Fuschi | 280/432 |
| 2,772,895 | 12/1956 | Steeves et al. | 280/432 |

*Primary Examiner*—Leo Friaglia
*Assistant Examiner*—R. Schrecengost
*Attorney, Agent, or Firm*—Richard J. Myers

[57] ABSTRACT

A fifth wheel plate assembly for connecting the kingpin of a trailer to a trailer hitch or truck tractor is provided with an auxiliary locking mechanism which in addition to a rotatable coupler jaw provides a secure and effective arrangement preventing the inadvertent movement of the kingpin from locked relation with respect to the fifth wheel plate.

9 Claims, 7 Drawing Figures

FIFTH WHEEL PLATE ASSEMBLY FOR TRAILER HITCH

A related application is Ser. No. 481,715 filed June 21, 1974.

BACKGROUND OF THE INVENTION

1. Field of the Invention

This invention concerns the field of fifth wheel plate assemblies which are used for connecting trailers with their kingpins either to a trailer hitch or, if desired, to the tractor which may be utilized to draw a trailer. The present fifth wheel plate is particularly adapted for connecting trailers to collapsible trailer hitches normally supported on railway flat cars.

2. Description of the Prior Art

The prior art is well illustrated in U.S. Pat. Nos. 2,610,862 — Sept. 16, 1952; 2,772,895 — Dec. 4, 1956; 2,784,986 — Mar. 12, 1957; 2,833,561 — May 6, 1958 and 3,268,250 — Aug. 23, 1966. The prior art devices provide generally auxiliary locking means disposed in the throat or entry slot of the fifth wheel assembly for preventing accidental uncoupling of the kingpin of the trailer. Most of these are quite complicated and require a multiplicity of manipulations for each operation of releasing and permitting entry of the kingpin. The present invention provides a more simplified effective arrangement wherein the locking device is automatically reset in a locked position after the trailer kingpin has been discharged from the fifth wheel plate.

SUMMARY OF THE INVENTION

A fifth wheel plate assembly for particular use with trailer hitches mounted on flat cars for securing trailers thereon is provided with an auxiliary lock situated in the throat of the fifth wheel plate to prevent the accidental discharge of the kingpin from the fifth wheel plate during operation. An auxiliary lock is desirable since it provides a failsafe means guarding against the negligence of the operator in the event he fails to properly lock the kingpin in the locking jaw in the fifth wheel plate. In the present invention a dog is pivoted below the fifth wheel plate in the path of movement of the kingpin. In the upright position of the dog the kingpin cannot move from the fifth wheel plate since the dog is locked and has to be swung to a lowered position before exit of the kingpin is possible. The dog is pivotally connected and is continually urged by means of a spring device to an upright locking position. Upon depression or movement of the dog in a counterclockwise direction the kingpin then is free to move from the throat of the fifth wheel plate. In this depressed position of the dog a latch device engages the dog and maintains the same in the depressed position. As the kingpin is discharged and moves outwardly from the kingpin plate it engages a surface of the dog depressing the same further and automatically releasing the latch means so that the dog again rises to its locking position after the kingpin has left the fifth wheel plate. As a kingpin enters the throat with the dog in its locked position to again couple the kingpin to the coupler jaw, the kingpin in its travel momentarily depresses the dog which then again quickly assumes its locking position and is therefore in an effective position.

DESCRIPTION OF THE PREFERRED EMBODIMENT

Figure 1:
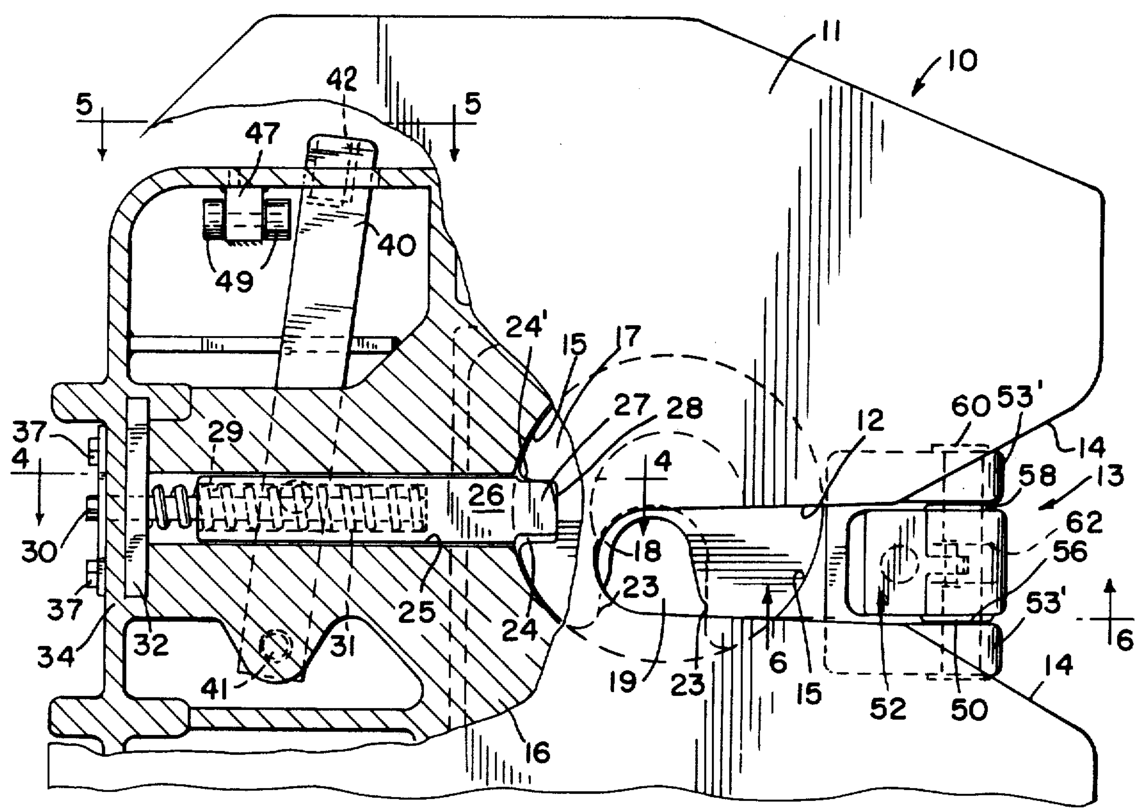
FIG. 1 is a plan view partially in section of a fifth wheel assembly.
Figure 2:
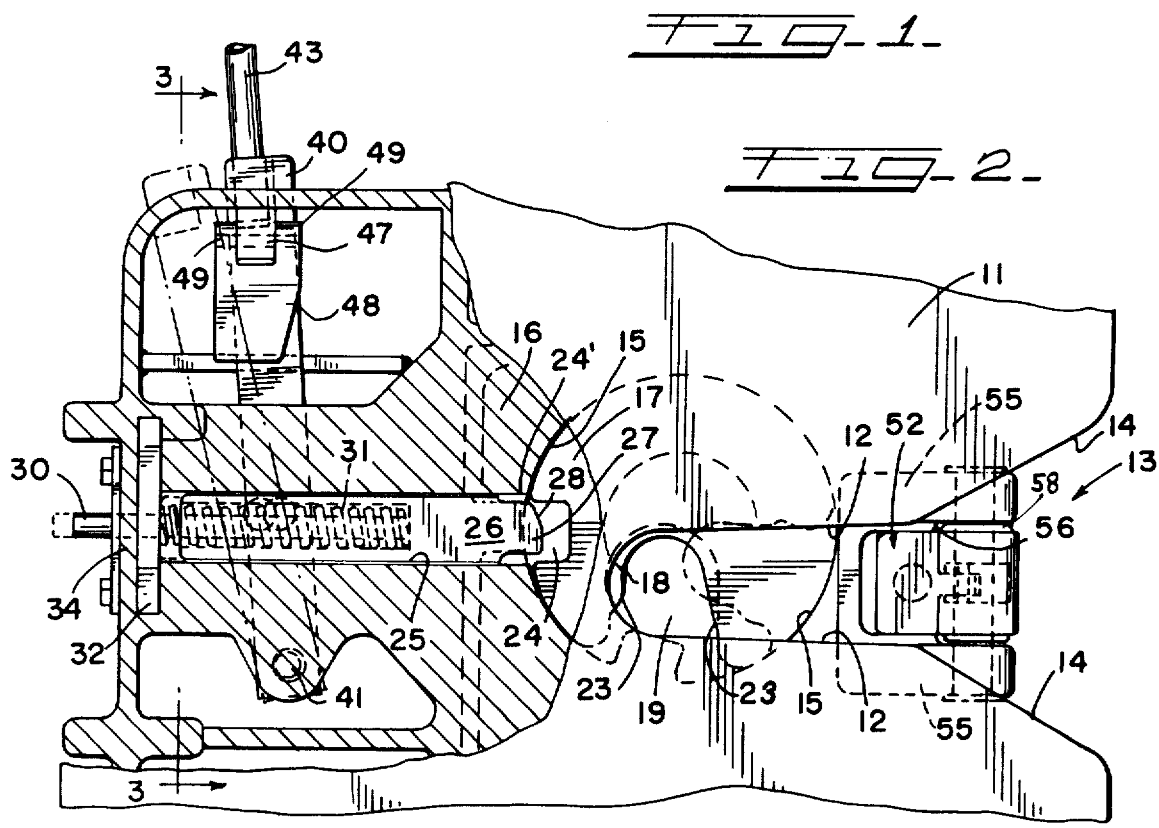
FIG. 2 is a view similar to FIG. 1 showing a stage in the operation of a locking plunger to an open position.
Figures 3, 4:
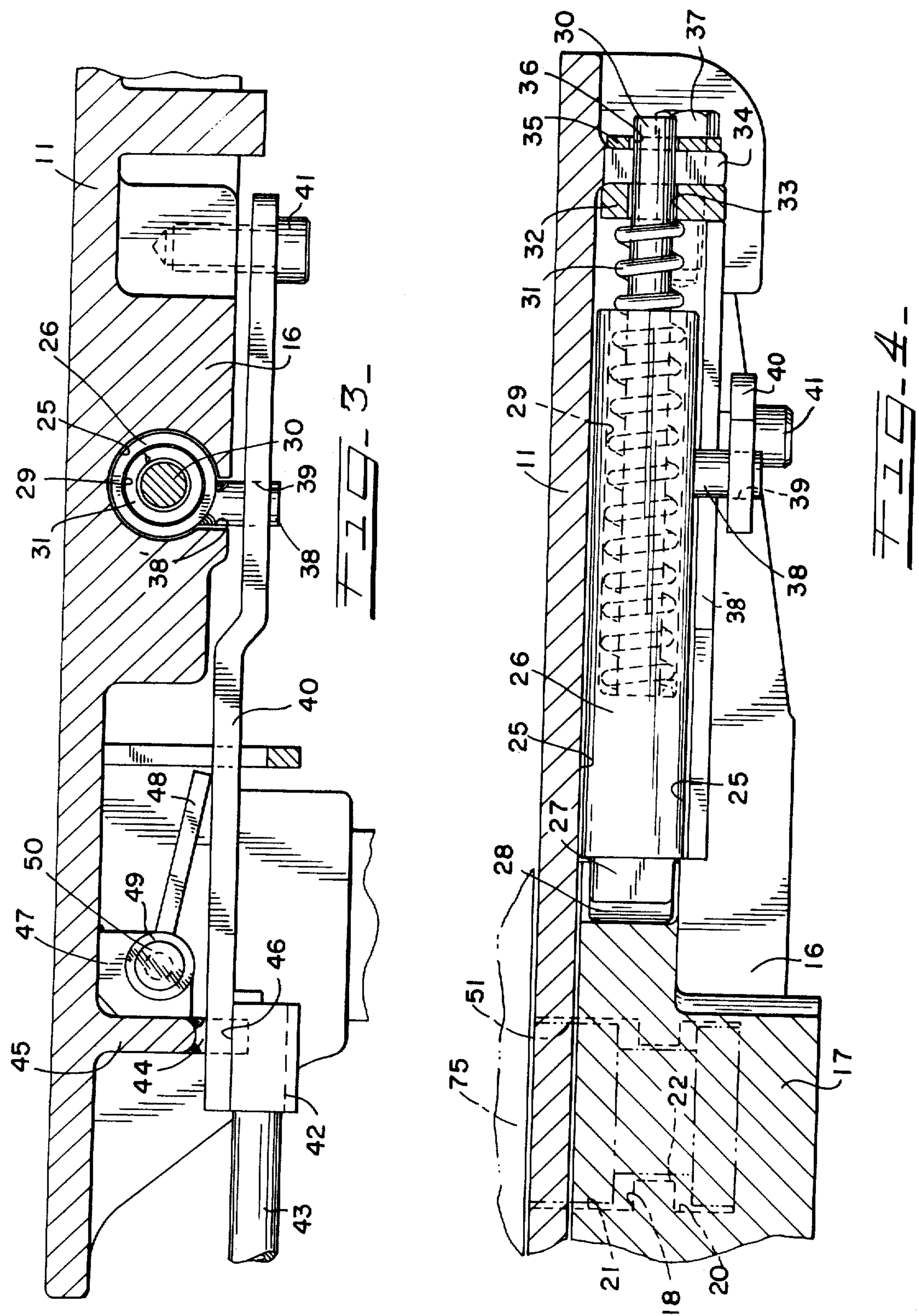
FIG. 3 is a cross-sectional view taken substantially along the line 3—3 of FIG. 2.
FIG. 4 is a cross-sectional view taken substantially along the line 4—4 of FIG. 1.
Figure 5:
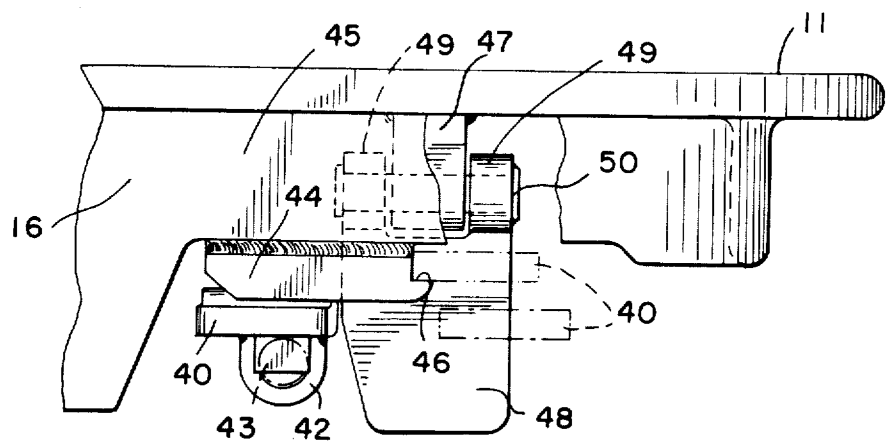
FIg. 5 is a cross-sectional view taken substantially along the line 5—5 of FIG. 1.
Figure 6:
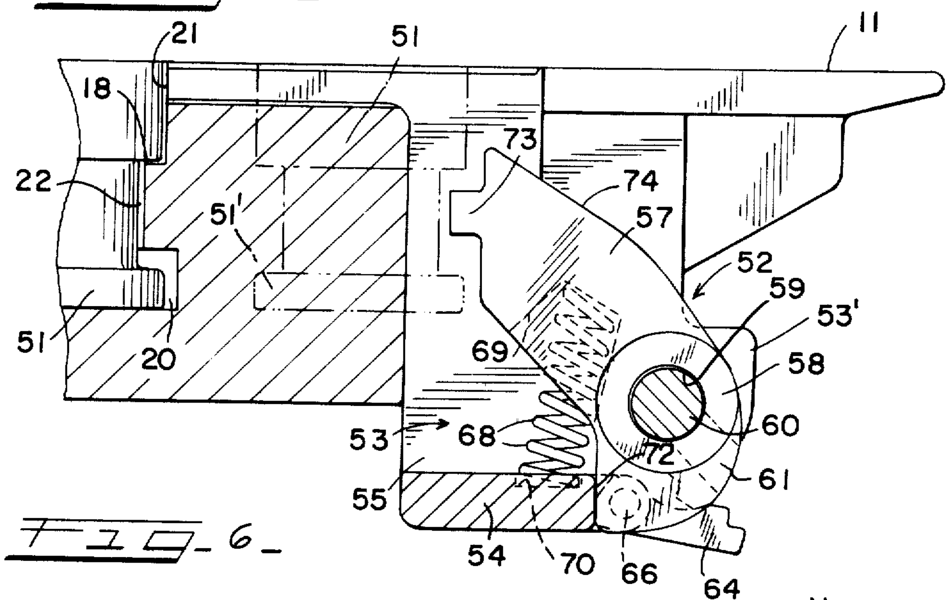
FIG. 6 is a cross-sectional view taken substantially along the line 6—6 of FIG. 1.

Referring to the drawings, a fifth wheel assembly 10 comprises a conventional top plate 11 having at a forward portion thereof an elongated entry slot 12 which communicates with a substantially central gathering aperture 13. The gathering aperture 13 comprises converging sides 14 which lead to a circular opening 15 provided in the top plate. A coupler jaw 17 is rotatably positioned for rotating movement within the circular opening 15. The gathering jaw is provided with a conventional shoulder 18 provided in a semi-cylindrical open end aperture 19 which is adapted to entrap and support a kingpin 51 in locked relation to the top plate 11. The semi-cylindrical open end aperture 19 also includes a lower semi-cylindrical socket 20 and an upper cylindrical socket 21 which are spaced apart by means of a reduced diameter semi-cylindrical bore 22, as best shown in FIG. 6. This arrangement is similar to that described in the aforementioned U.S. Pat. No. 3,268,250. The open end aperture 19 is also formed by arcuate irregular sides 23 which serve to expedite the entry of the kingpin into seating arrangement with respect to said semi-cylindrical open end aperture 19. As best shown in FIGS. 1 and 2, the coupler jaw also includes a peripheral locking notch 24 having at one end a curved camming edge 24'. The top plate which includes an integral base 16 extending downwardly from said plate is provided with a plurality of webs and thickened sections which are not described in detail except those which particularly apply to associated structure set forth herein. A thickened portion of the base 16 includes an elongated bore 25 in which a locking plunger 26 is slidingly positioned. The locking plunger 26 is provided at one end with an integral locking cam 27 having a tapered cam face 28, as best shown in FIGS. 1 and 2. The locking cam 27, as shown in FIG. 1, is in locking engagement with the locking notch 24 of the coupler jaw 17. The locking plunger also includes an elongated bore 29 within which a rod 30 is positioned. The rod 30, as best shown in FIG. 4, projects outwardly from one end of the locking plunger 26 and supports a coil spring 31 which is in abutting relation with respect to a backup plate 32 secured to a web 34 projecting downwardly from the top plate 11. The backup plate 32 is provided with an aperture 33 through which the rod 30 projects and the said rod 30 also projects through the web 34 and through an attachment plate 35 having a bore 36, the said plate 35 being suitably attached to the web 34 and backup plate 32 by means of screws 37. As best shown in FIGS. 3 and 4, the rod 30 has a downwardly extending cylindrical projection 38 which is adapted to slide longitudinally within an open end slot 38' in the base 16. The cylindrical projection 38 extends through an opening 39 in a lever 40 which is pivoted on the base 16 by means of a cap screw 41, as best shown in FIGS. 3 and 4. The end of the lever 40 is provided with a socket 42 within which a handle 43 is rigidly positioned, the same being adapted for manual movement by means of an operator. As best shown in FIG. 5, a support bracket 44 is fixedly connected to a web 45 of the top plate 11, the said bracket 44 including a support notch 46.

As best shown in FIGS. 1, 2, 3 and 5, a bracket 47 projects downwardly from the top plate 11 and pivotally supports an indicating flag and stop arrangement generally indicated at 48. The flag and stop arrangement 48 includes spaced fingers 49 supporting a hinge pin 50 which is pivotally supported on the bracket 47.

Figure 7:
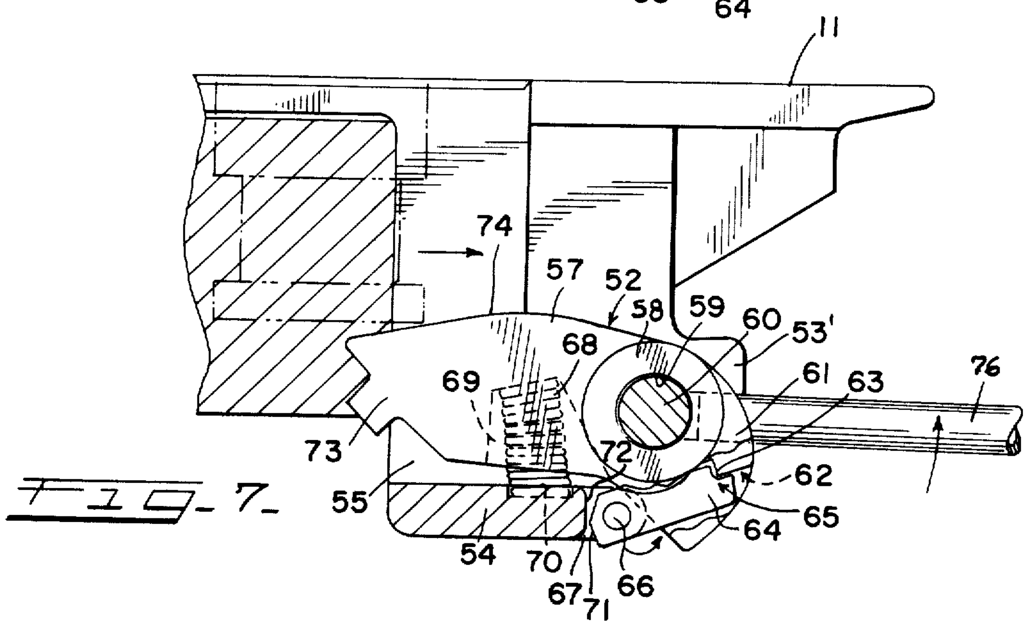
FIG. 7 is a view similar to FIG. 6 showing an operating position of a locking dog.

A conventional kingpin is designated at 51 and is disclosed in FIGS. 4, 6 and 7. The kingpin 51 will be described in more detail in the following description. An auxiliary lock is generally designated at 52 and includes a U-shaped bracket 53 rigidly connected to the underneath side of the top plate 11. The U-shaped bracket is disposed between opposite sides of the elongated entry slot 12 and includes a lower horizontal wall 54 and vertical side walls 55. The lower wall 54 is cut out as indicated at 56 in FIG. 2 to provide a vertically extending edge portion 72. The auxiliary lock includes a hinged dog 57 having laterally spaced integral bearing shoulders 58 and a transverse bore 59. A hinge pin 60 extends through the bore 59 and is firmly supported on apertured finger projections 53'.

The dog 57 includes a foot portion 61 projecting downwardly which is cut out or slotted at 62, FIG. 7, to provide a shoulder arrangement designated at 63. A latch 64 provided with a complemental shoulder arrangement 65 is hingedly connected by means of a hinge pin 66 to a pair of projecting arms 67 extending outwardly on opposite sides of the cutout portion 56 and the vertical face 72.

A cylindrical spring 68 is provided in a socket 69 in the dog 57 and the other end is secured within a recessed spring seat 70 provided in the lower wall 54. The latch 64 is also provided with an end portion 71 which is adapted to engage the vertical edge 72, as best shown in FIG. 6 when the latch 64 is in a non-securing position. The dog 57 also is provided with an upper tapering edge 74, as best shown in FIGS. 6 and 7.

THE OPERATION

In FIG. 4 the broken line portion 75 designates the lower surface of a trailer having the kingpin 51 projecting downwardly therefrom in conventional fashion. In the use of the fifth wheel on a trailer hitch the same is in a stationary position on a railway flat car. The trailer is then maneuvered in a position wherein the kingpin enters the gathering aperture through the converging sides 14 into the gathering aperture 13. The coupler jaw 17 is positioned with the semi-cylindrical open end aperture 19 in registry with the gathering aperture and elongated entry slot 12 to receive the kingpin.

In the position shown in FIG. 1, the coupler jaw 17 is positioned in a closed position since the locking notch 24 is firmly engaged by the locking cam 27 of the locking plunger 26. The kingpin is not shown in FIGS. 1 and 2, the same being shown in the locked position in FIG. 4. In this particular locked position, the lever 40 is in the position shown in FIG. 1, and is nonfunctional except that it cannot be moved from the position shown in FIG. 1 in view of the flag and stop 48 which is pivoted downwardly by gravity and is in the path of movement of the lever 40. This then prevents any possibility of the locking plunger 26 being removed from locking engagement with respect to the coupler jaw 17 as shown in FIG. 1.

Assuming now that the operator wishes to unlock the coupler jaw to remove the kingpin and trailer after the flat car has reached its destination. The operator first manually moves the flag 48 from its in-the-way position of FIG. 1 to an out-of-the-way position substantially horizontally as shown in FIG. 2 so that the operator may now move the lever 40 underneath the flag 48 to manually remove the lock plunger 26 from the locking engagement. As the operator moves the lever 40, the cam 27 is withdrawn against the action of the coil spring 31 to the dotted line position shown in FIG. 2. Manipulation of the trailer now causes the locking jaw to freely rotate from the position shown in FIG. 1 to the position shown in FIG. 2 whereupon the kingpin is free to move outwardly from the entry slot, subject, of course, to release of the auxiliary lock 52 which will be described later. The position of the lever 40 to the dotted line position as shown in FIG. 2 is only momentary to permit the locking jaw to rotate. To keep the lever in a cocked position at this time, the operator immediately shifts the lever 40 upwardly to the position shown in FIG. 5 wherein the lever is held within the support notch 46. At this point then the lever 40 is in the full line position shown in FIG. 2 and the cam face 28 of the locking plunger 26 is still slightly within the socket 24, since at this point the coupler jaw 17 has not rotated. As the coupler jaw now rotates to the opened position shown in the dotted lines of FIG. 2 and the locking notch 24 moves to the open position, the camming edge 24' engages the sloping cam face 28 of the locking cam 27 and moves the locking plunger 26 outwardly completely from the opening 24 which, in turn, causes the lever 40 to move outwardly from the support notch 46 and freely fall by gravity to the dotted line position shown in FIG. 5. The flag 48 still at this point rests upon the upper surface of the lever 40 as shown in FIG. 3. Thus the plunger 26 remains in a cocked position and rides about the outer peripheral surface of the coupler jaw which is moving to the open position to discharge the kingpin. Upon re-entry of the kingpin into the coupler jaw, the same is again rotated to the closed position shown in FIGS. 1 and 2. The locking plunger is biased toward the locking jaw with the cam face 28 ready to engage the notch 24 when in registry therewith. Upon such engagement the lever 40 is again placed in the position shown in FIG. 1. The flag and stop 48 now is returned by gravity to its locked position as shown in FIG. 1 which is in the path of movement of the lever 40. Thus complete automatic locking is assured since the plunger 26 is in a cocked position immediately after the locking notch 24 is placed out of alignment with the end of the locking plunger 26.

In the operation the auxiliary lock 57 is effective to provide a secondary means preventing the kingpin from moving out of the elongated entry slot 12. In the position shown in FIG. 6, the dog 57 blocks the movement of the kingpin from the dotted line position shown even though the kingpin 51 might have been released from the open end aperture 19 of the coupler jaw. Thus in this position the necessary movement out of the elongated slot 12 and gathering aperture 13 is prevented, the dog 57 being in the path of movement of the kingpin. The projecting boss 73 also is disposed inwardly with respect to the spool shaped cylindrical portions 51' of the kingpin 51, as shown in broken lines in FIG. 6, so that any upward movement of the kingpin is limited. In the position shown in FIG. 6 the hinged dog 57 is in the upright position being urged to maintain the said position by virtue of the spring 68. In this position the foot portion 61 is in abutting relation with respect to the vertical edge 72 of the lower wall 54. As best shown in FIG. 6, the latch element 64 is also in its release position with its rear edge 71 engaging the wall 72. In order to fully release the kingpin 51 from its engagement with the top plate it is necessary to manually depress the dog 57 to the position shown in FIG. 7. In this position the spring 68 is compressed. The latch 64 has been manually rotated in a counterclockwise direction to and in engagement with the foot portion 61 with the shoulders 63 and 65 in interengagement whereby the dog is held in the lowered position against the action of the spring 68. In order to move the dog 57 to this position a rod 76 is inserted in a suitable aperture in the foot portion 61 to facilitate handling by the operator. Thus the kingpin 51 as shown in FIG. 7 is now free to move in the direction of the arrow outwardly from the top plate. As it moves in this direction the lowermost end of the cylindrical spool shaped enlargement 51' engages the tapered edge or surface 74 of the hinge dog 57 and rotates the same slightly in the counterclockwise direction whereupon the latch 64 is now free to fall downwardly by gravity to the position shown in FIG. 6 whereupon the dog 57 again assumes its locking position.

When a kingpin 51 again enters into the gathering aperture 32 and travels through the entry slot 12 it engages the surface 74 to lower or pivot the dog in the counterclockwise direction so that the kingpin is free to pass to the position within the coupler jaw. After the kingpin has traveled by the dog, it is again raised by means of the spring 68 to the position shown in FIG. 6 which is the auxiliary locking position.

What is claimed is:

1. A fifth wheel plate assembly for connection with the kingpin of a trailer, comprising a plate having a substantially circular opening for receiving said king pin and an entry slot in communication therewith, locking means on said plate movable into engagement with said king pin for releasably locking the same within said circular opening to connect the kingpin and the trailer, the improvement comprising, an auxiliary lock including a locking member positioned within said entry slot in longitudinally spaced relation relative to said circular opening, said locking member including an abutment, means connecting said locking member to the underneath side of said plate for hinging movement from a position blocking release of a kingpin within said circular opening to a position wherein a major portion of said locking member is disposed in an out-of-the-way position and said kingpin is free to move through said slot relative to said circular opening, means biasing said locking member to said blocking position, latch means being disposable in engagement with said abutment when said locking member is moved from said blocking position to said out-of-the-way position, said biasing means urging the abutment of said locking member into engagement with said latch means to hold said locking member in said out-of-the-way position, and said locking member including means extending across the slot and engaged by said kingpin moving through said slot for moving said locking member to effect disengagement of said abutment with said latch means whereby said biasing means returns said locking member from said out-of-the-way position to said blocking position.

2. The invention in accordance with claim 1, said locking member including boss means for engaging said kingpin so as to limit upward movement of said kingpin when said locking member is in said blocking position and said kingpin is in said slot.

3. A fifth wheel plate assembly for connection with the kingpin of a trailer, comprising a plate having a substantially circular opening for receiving said kingpin and an entry slot in communication therewith, locking means on said plate movable into engagement with said kingpin for releasably locking the same within said circular opening to connect the kingpin and the trailer, the improvement comprising, an auxiliary lock including a locking member positioned within said entry slot in longitudinally spaced relation relative to said circular opening, means hingedly connecting said locking member to the underneath side of said plate for hinging movement from a position blocking release of a kingpin within said circular opening to a position wherein a major portion of said locking member is disposed in an out-of-the-way position and said kingpin is free to move through said slot relative to said circular opening, means biasing said locking member to said blocking position, manual means adapted to move said locking member to said out-of-the-way position, latch means adapted to retain said locking member in said out-of-the-way position, said locking member including means engaged by said kingpin moving through said slot for moving said locking member out of engagement with said latch means whereby said biasing means returns said locking member to said blocking position, and said means hingedly connecting said locking member to said plate including horizontal hinge pin means extending transversely relative to said slot.

4. A fifth wheel plate assembly for connection with the kingpin of a trailer, comprising a plate having a substantially circular opening for receiving said kingpin and an entry slot in communication therewith, locking means on said plate movable into engagement with said kingpin for releasably locking the same within said circular opening to connect the kingpin and the trailer, the improvement comprising, an auxiliary lock including a locking member positioned within said entry slot in longitudinally spaced relation relative to said circular opening, means hingedly connecting said locking member to the underneath side of said plate for hinging movement from a position blocking release of a kingpin within said circular opening to a position wherein a major portion of said locking member is disposed in an out-of-the-way position and said kingpin is free to move through said slot relative to said circular opening, means biasing said locking member to said blocking position, manual means adapted to move said locking member to said out-of-the-way position, latch means adapted to retain said locking member in said out-of-the-way position, said locking member including means engaged by said kingpin moving through said slot for moving said locking member out of engagement with said latch means whereby said biasing means returns said locking member to said blocking position, and said biasing means comprising a spring urging said locking member in a clockwise direction.

5. The invention in accordance with claim 4, said means hingedly connecting said locking member to said plate, including a U-shaped bracket having spaced vertical sides disposed on opposite sides of said slot, a horizontal base member connecting said vertical sides, means anchoring one end of said spring on said base, hinge pin means supported on said sides, and said locking member being supported by said hinge pin means.

6. A fifth wheel plate assembly for connection with the kingpin of a trailer, comprising a plate having a substantially circular opening for receiving said kingpin and an entry slot in communication therewith, locking means on said plate movable into engagement with said kingpin for releasably locking the same within said circular opening to connect the kingpin and the trailer, the improvement comprising, an auxiliary lock including a locking member positioned within said entry slot in longitudinally spaced relation relative to said circular opening, means connecting said locking member to the underneath side of said plate for hinging movement from a position blocking release of a kingpin within said circular opening to a position wherein a major portion of said locking member is disposed in an out-of-the-way position and said kingpin is free to move through said slot relative to said circular opening, means biasing said locking member to said blocking position, manual means adapted to move said locking member to said out-of-the-way position, latch means adapted to retain said locking member in said out-of-the-way position, said locking member including means engaged by said kingpin moving through said slot for moving said locking member out of engagement with said latch means whereby said biasing means returns said locking member to said blocking position, and said means engaged by said kingpin including a camming surface on one side of said locking member.

7. A fifth wheel plate assembly for connection with the kingpin of a trailer, comprising a plate having a substantially circular opening for receiving said kingpin and an entry slot in communication therewith, locking means on said plate movable into engagement with said kingpin for releasably locking the same within said circular opening to connect the kingpin and the trailer, the improvement comprising, an auxiliary lock including a locking member positioned within said entry slot in longitudinally spaced relation relative to said circular opening, means connecting said locking member to the underneath side of said plate for hinging movement from a position blocking release of a kingpin within said circular opening to a position wherein a major portion of said locking member is disposed in an out-of-the-way position and said kingpin is free to move through said slot relative to said circular opening, means biasing said locking means to said blocking position, manual means adapted to move said locking member to said out-of-the-way position, latch means adapted to retain said locking member in said out-of-the-way position, said locking member including means engaged by said kingpin moving through said slot for moving said locking member out of engagement with said latch means whereby said biasing means returns said locking member to said blocking position, said latch means including a hinged latch element, said locking member including an abutment, said latch element being movable into engagement with said abutment whereby said biasing means urges retention of said latch element in engagement with said abutment as said locking member is in said out-of-the-way position, and said latch element being released by gravity from said abutment upon movement of said locking member in response to engagement of said kingpin moving through said slot and being in engagement with said means on said locking member to effect return of said locking member to said blocking position.

8. The invention in accordance with claim 7, said means engaged by said kingpin including a camming surface on said locking member, said camming surface being engaged by a kingpin moving through said slot to said circular opening to depress said locking member momentarily, and said biasing means then restores said locking member to said blocking position when said kingpin is coupled within said circular opening.

9. A fifth wheel plate assembly for connection with the kingpin of a trailer, comprising a plate having a substantially circular opening for receiving said kingpin and an entry slot in communication therewith, locking means on said plate movable into engagement with said kingpin for releasably locking the same within said circular opening to connect the kingpin and the trailer, the improvement comprising, an auxiliary lock including a locking member positioned within said entry slot in longitudinally spaced relation relative to said circular opening, means connecting said locking member to the underneath side of said plate for hinging movement from a position blocking release of a kingpin within said circular opening to a position wherein a major portion of said locking member is disposed in an out-of-the-way position and said kingpin is free to move through said slot relative to said circular opening, means biasing said locking member to said blocking position, manual means adapted to move said locking member to said out-of-the-way position, latch means adapted to retain said locking member in said out-of-the-way position, said locking member including means engaged by said kingpin moving through said slot for moving said locking member out of engagement with said latch means whereby said biasing means returns said locking member to said blocking position, and including stop means supported on said plate for limiting the movement of said locking member between a substantially upright blocking position and a substantially depressed horizontal position.

* * * * *